US012690118B2

(12) United States Patent
Szilagyi et al.

(10) Patent No.: US 12,690,118 B2
(45) Date of Patent: Jul. 21, 2026

(54) SYSTEM AND METHOD FOR VACUUM ULTRAVIOLET LAMP ASSISTED IGNITION OF OXYGEN-CONTAINING LASER SUSTAINED PLASMA SOURCES

(71) Applicant: KLA Corporation, Milpitas, CA (US)

(72) Inventors: John Szilagyi, Livermore, CA (US); Ilya Bezel, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/535,840

(22) Filed: Dec. 11, 2023

(65) Prior Publication Data

US 2024/0138048 A1 Apr. 25, 2024

Related U.S. Application Data

(63) Continuation of application No. 16/654,230, filed on Oct. 16, 2019, now Pat. No. 11,844,172.

(51) Int. Cl.
| | |
|---|---|
| *H05H 1/46* | (2006.01) |
| *C01B 13/10* | (2006.01) |
| *H01J 65/04* | (2006.01) |

(52) U.S. Cl.
CPC .............. *H05H 1/46* (2013.01); *C01B 13/10* (2013.01); *H01J 65/04* (2013.01)

(58) Field of Classification Search
CPC .......... H05H 1/64; H05G 2/008; C01B 13/10; H01J 65/00; H01J 65/04
See application file for complete search history.

(56) References Cited

U.S. PATENT DOCUMENTS

| | | | |
|---|---|---|---|
| 4,265,747 A | 5/1981 | Copa et al. |
| 4,504,445 A | 3/1985 | Walz |
| 5,608,526 A | 3/1997 | Piwonka-Corle et al. |
| | (Continued) | | |

FOREIGN PATENT DOCUMENTS

| | | |
|---|---|---|
| CN | 107710880 A | 2/2018 |
| CN | 108140538 A | 6/2018 |
| | (Continued) | |

OTHER PUBLICATIONS

Taiwan Patent Office, Office Action received in TW Application No. 109134548, Aug. 20, 2024, 20 pages (including translation).

(Continued)

*Primary Examiner* — David E Smith
(74) *Attorney, Agent, or Firm* — Suiter Swantz IP

(57) ABSTRACT

An illumination system includes a gas containment vessel configured to contain a gas. The illumination system also includes one or more pump sources configured to generate one or more pump beams. The illumination system includes an ozone generation unit including one or more illumination sources. The one or more illumination sources are configured to generate a beam of illumination of an energy sufficient for converting a portion of diatomic oxygen ($O_2$) contained within the gas containment vessel to triatomic oxygen ($O_3$). One or more energy sources are configured to ignite the plasma within the gas contained within the gas containment vessel via absorption of energy of the one or more energy sources by a portion of the triatomic oxygen, wherein the plasma emits broadband radiation.

17 Claims, 5 Drawing Sheets

(56) References Cited

U.S. PATENT DOCUMENTS

| | | | |
|---|---|---|---|
| 5,999,310 A | 12/1999 | Shafer et al. | |
| 6,297,880 B1 | 10/2001 | Rosencwaig et al. | |
| 6,441,552 B1 * | 8/2002 | Brandenburg | H05H 1/46 |
| | | | 315/111.21 |
| 7,435,982 B2 | 10/2008 | Smith | |
| 7,525,649 B1 | 4/2009 | Leong et al. | |
| 7,705,331 B1 * | 4/2010 | Kirk | H01J 65/04 |
| | | | 250/493.1 |
| 7,786,455 B2 | 8/2010 | Smith | |
| 7,989,786 B2 | 8/2011 | Smith et al. | |
| 8,182,127 B2 | 5/2012 | Yasuda et al. | |
| 8,309,943 B2 | 11/2012 | Smith et al. | |
| 8,525,138 B2 | 9/2013 | Smith et al. | |
| 8,618,254 B2 | 12/2013 | Giaccia et al. | |
| 8,921,814 B2 | 12/2014 | Pellemans et al. | |
| 9,318,311 B2 | 4/2016 | Chimmalgi et al. | |
| 9,941,655 B2 | 4/2018 | Chimmalgi et al. | |
| 10,244,613 B2 | 3/2019 | Chimmalgi et al. | |
| 2003/0106881 A1 | 6/2003 | Lee et al. | |
| 2007/0002465 A1 | 1/2007 | Chuang et al. | |
| 2009/0180176 A1 | 7/2009 | Armstrong et al. | |
| 2013/0114085 A1 | 5/2013 | Wang et al. | |
| 2013/0337226 A1 * | 12/2013 | Curran | C09D 5/00 |
| | | | 427/322 |
| 2015/0221479 A1 | 8/2015 | Chen et al. | |
| 2019/0287785 A1 | 9/2019 | Bezel et al. | |
| 2019/0295804 A1 | 9/2019 | Delgado et al. | |
| 2019/0371601 A1 * | 12/2019 | Komatsu | H10P 14/69215 |

FOREIGN PATENT DOCUMENTS

| | | | |
|---|---|---|---|
| CN | 108780732 A | 11/2018 | |
| JP | 2000208464 A | 7/2000 | |
| KR | 1020190103375 A | 9/2019 | |
| WO | 0219379 A1 | 3/2002 | |
| WO | 2018134024 A1 | 7/2018 | |
| WO | 2021076534 A1 | 4/2021 | |

OTHER PUBLICATIONS

Gorshelev, V. et al., "High spectral resolution ozone absorption cross-sections—Part 1: Measurements, data analysis and comparison with previous measurements around 293 K", Atmos. Meas. Tech., 7, 609-624, 2014, www.atmos-meas-tech.net/7/609/2014/.

PCT International Search Report and Written Opinion for International Application No. PCT/US2020/055443 dated Feb. 3, 2021, 8 pages.

Korean Intellectual Property Office, Office Action received in KR Application No. 10-2022-7016281, Mar. 12, 2025, 12 pages (including translation).

Chinese Patent Office, Office Action received in CN Application No. 202080070435.7, Jul. 19, 2025, 9 pages (including translation).

Taiwan Patent Office, Office Action received in TW Application No. 114125947, Jan. 7, 2026, 8 pages (including translation).

Wu Shuqun et al., "Research on the Spatiotemporal Distribution of OH Free Radicals and O Atoms in Atmospheric Pressure Low-Temperature Plasma Jet Based on Laser-Induced Fluorescence Method," (Chinese), Journal of Electrical Engineering and Technology, Transactions of China Electrotechnical Society, vol. 32, Issue 08, pp. 88-100, Apr. 2017.

* cited by examiner

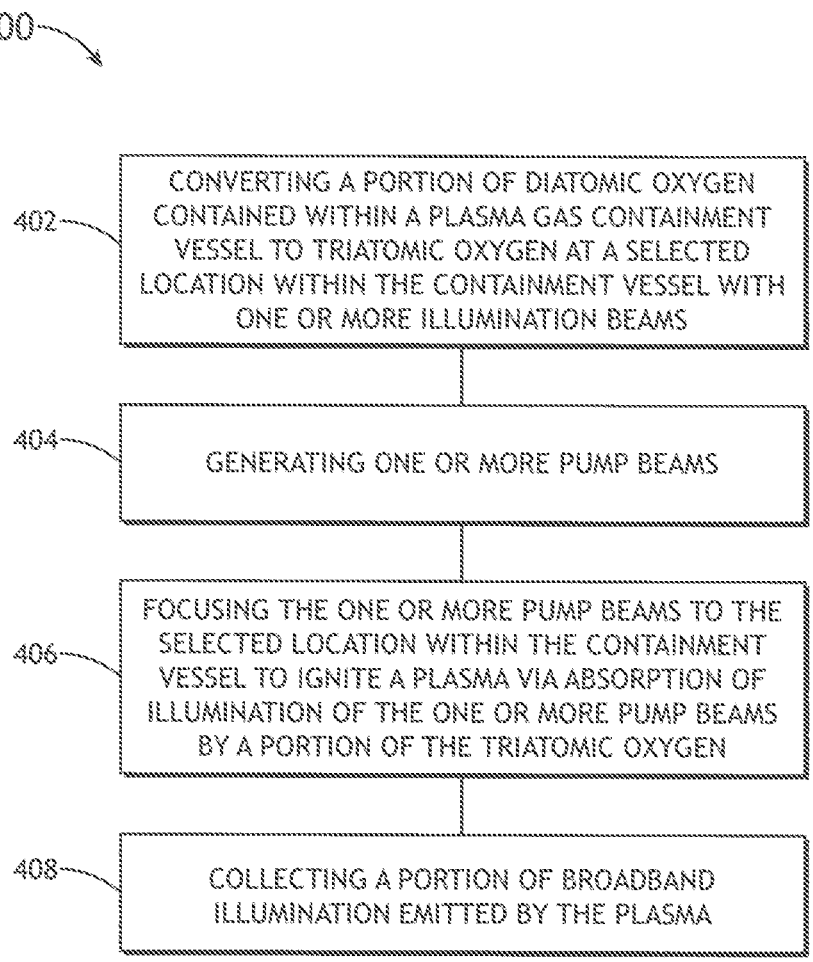

400

402 —
CONVERTING A PORTION OF DIATOMIC OXYGEN CONTAINED WITHIN A PLASMA GAS CONTAINMENT VESSEL TO TRIATOMIC OXYGEN AT A SELECTED LOCATION WITHIN THE CONTAINMENT VESSEL WITH ONE OR MORE ILLUMINATION BEAMS

404 —
GENERATING ONE OR MORE PUMP BEAMS

406 —
FOCUSING THE ONE OR MORE PUMP BEAMS TO THE SELECTED LOCATION WITHIN THE CONTAINMENT VESSEL TO IGNITE A PLASMA VIA ABSORPTION OF ILLUMINATION OF THE ONE OR MORE PUMP BEAMS BY A PORTION OF THE TRIATOMIC OXYGEN

408 —
COLLECTING A PORTION OF BROADBAND ILLUMINATION EMITTED BY THE PLASMA

FIG.4

SYSTEM AND METHOD FOR VACUUM ULTRAVIOLET LAMP ASSISTED IGNITION OF OXYGEN-CONTAINING LASER SUSTAINED PLASMA SOURCES

CROSS-REFERENCE TO RELATED APPLICATION

The present application claims priority to and constitutes a continuation patent application of U.S. patent application Ser. No. 16/654,230, filed on Oct. 16, 2019, which is incorporated by reference in the entirety.

TECHNICAL FIELD

The present disclosure relates generally to illumination sources, and more particularly, to laser sustained plasma (LSP) sources.

BACKGROUND

The need for improved illumination systems used for inspection of ever-shrinking semiconductor devices continues to grow. One such illumination system includes a laser sustained plasma (LSP) illumination system. LSP illumination systems include LSP lamps, which are capable of producing high-power broadband light. LSP lamps operate by focusing laser radiation into a gas volume in order to excite the gas into a plasma state. Once ignited, the plasma emits broadband radiation. Typically, LSP lamps require electrodes to ignite the plasma, which is then sustained solely by laser energy. Current LSP lamps are filled with rare gases, such as argon, krypton, xenon, or nitrogen. Oxygen cannot be added in a LSP lamp containing electrodes because severe oxidation occurs during lamp operation. This makes igniting the plasma a complex and expensive process. Furthermore, it makes it difficult to align and maintain the illumination system.

Therefore, it would be desirable to provide a system and method that cure the shortfalls of the previous approaches identified above.

SUMMARY

A system is disclosed, in accordance with one or more embodiments of the present disclosure. In one embodiment, the system includes a gas containment vessel configured to contain a gas. In another embodiment, the system includes one or more pump sources configured to generate one or more pump beams for sustaining a plasma within the gas containment vessel. In another embodiment, the system includes an ozone generation unit including one or more illumination sources. In another embodiment, the one or more illumination sources are configured to generate a beam of illumination of an energy sufficient for converting a portion of diatomic oxygen ($O_2$) contained within the gas containment vessel to triatomic oxygen ($O_3$). In another embodiment, one or more energy sources are configured to ignite the plasma within the gas contained within the gas containment vessel absorption of energy of the one or more energy sources by a portion of the triatomic oxygen, wherein the plasma emits broadband radiation.

An apparatus is disclosed, in accordance with one or more embodiments of the present disclosure. In one embodiment, the apparatus includes an ozone generation unit including one or more illumination sources. In another embodiment, the one or more illumination sources are configured to generate a beam of illumination of an energy sufficient for converting a portion of diatomic oxygen ($O_2$) contained within a gas containment vessel of a broadband illumination source of a sample characterization system to triatomic oxygen ($O_3$).

An apparatus is disclosed, in accordance with one or more embodiments of the present disclosure. In one embodiment, the apparatus includes a gas containment vessel for containing a gas. In another embodiment, the gas includes at least triatomic oxygen. In another embodiment, the gas containment vessel is configured to receive pump illumination from a pump source for sustaining a plasma within the gas containment vessel. In another embodiment, one or more portions of the gas containment vessel are transparent to the pump illumination and a portion of broadband light emitted by the plasma.

A method is disclosed, in accordance with one or more embodiments of the present disclosure. In one embodiment, the method includes converting a portion of diatomic oxygen contained with a gas containment vessel to triatomic oxygen at a selected location within the gas containment vessel with one or more illumination beams. In another embodiment, the method includes generating one or more pump beams. In another embodiment, the method includes focusing the one or more pump beams to the selected location within the gas containment vessel to ignite a plasma via absorption of illumination of the one or more pump beams by a portion of the triatomic oxygen. In another embodiment, the method includes collection a portion of broadband illumination emitted by the plasma.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 4 is a flow diagram illustrating a method for implementing a laser sustained plasma illumination system, in accordance with one or more embodiments of the present disclosure.

DETAILED DESCRIPTION

Figure 1A:
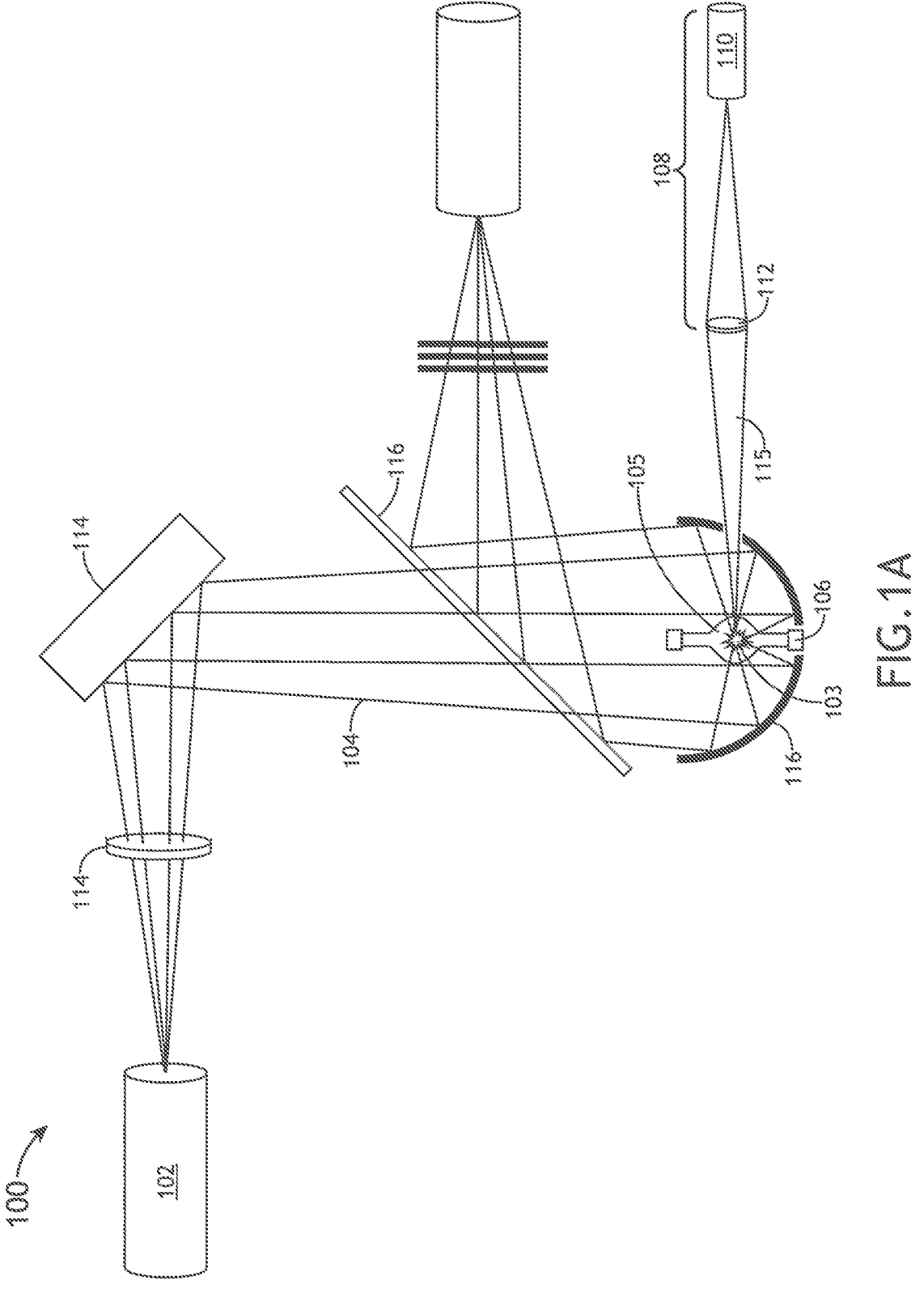
FIG. 1A is a schematic illustration of a laser sustained plasma (LSP) illumination system with illumination-assisted plasma ignition, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Referring generally to FIGS. 1A through 4, a system and method are disclosed for plasma generation with illumination-assisted plasma ignition within an oxygen-containing gas containment vessel, in accordance with one or more embodiments of the present disclosure.

Embodiments of the present disclosure are directed to a system and method for plasma generation with illumination-assisted plasma ignition within an oxygen-containing gas containment vessel. More particularly, embodiments of the present disclosure are directed to a system and method for igniting plasma contained within a gas containment vessel using one or more illumination sources and one or more energy sources. Specifically, embodiments of the present disclosure are directed to a system and method for igniting plasma using one or more illumination sources to convert diatomic oxygen ($O_2$) into triatomic oxygen ($O_3$) and using one or pump sources as the one or more energy sources to ignite the plasma when the energy from the one or more energy sources is absorbed by the triatomic oxygen ($O_3$) within the gas containment vessel. Additional embodiments of the present disclosure are directed to the use of one or more pump sources to sustain the plasma and one or more energy sources (e.g., one or more start lasers) to ignite the plasma.

As noted previously herein, laser sustained plasma (LSP) lamps are often used as broadband light sources in a variety of applications including wafer inspection and metrology. LSP lamps are filled with rare gases such as argon, krypton, xenon, nitrogen, and the like. However, it is advantageous to add oxygen to the gas mixture inside the lamp. Oxygen can block vacuum ultraviolet (VUV) radiation that may be damaging to the glass envelope of the lamp and can also heal the defects caused by oxygen depletion on the internal surface of the lamp. Additionally, the presence of oxygen in the LSP lamp suppresses the initiation of the start laser breakdown where almost an order of magnitude higher of start laser power had to be used in oxygen-containing lamps compared to pure xenon lamps. However, oxygen cannot be added in a lamp with electrodes because it causes severe oxidation during lamp operation.

The generation of a light-sustained plasma is generally described in U.S. Pat. No. 7,435,982, issued on Oct. 14, 2008, which is incorporated by reference herein in the entirety. The generation of plasma is also generally described in U.S. Pat. No. 7,786,455, issued on Aug. 31, 2010, which is incorporated by reference herein in the entirety. The generation of plasma is also generally described in U.S. Pat. No. 7,989,786, issued on Aug. 2, 2011, which is incorporated by reference herein in the entirety. The generation of plasma is also generally described in U.S. Pat. No. 8,182,127, issued on May 22, 2012, which is incorporated by reference herein in the entirety. The generation of plasma is also generally described in U.S. Pat. No. 8,309,943, issued on Nov. 13, 2012, which is incorporated by reference herein in the entirety. The generation of plasma is also generally described in U.S. Pat. No. 8,525,138, issued on Feb. 9, 2013, which is incorporated by reference herein in the entirety. The generation of plasma is also generally described in U.S. Pat. No. 8,921,814, issued on Dec. 30, 2014, which is incorporated by reference herein in the entirety. The generation of plasma is also generally described in U.S. Pat. No. 9,318,311, issued on Apr. 19, 2016, which is incorporated by reference herein in the entirety. The generation of plasma is also generally described in U.S. Pat. No. 9,941,655, issued on Apr. 10, 2018, which is incorporated by reference herein in the entirety. Electrodeless plasma is described generally in U.S. Pat. No. 10,244,613, issued Mar. 26, 2019, which is incorporated herein by reference in the entirety.

Figure 1B:
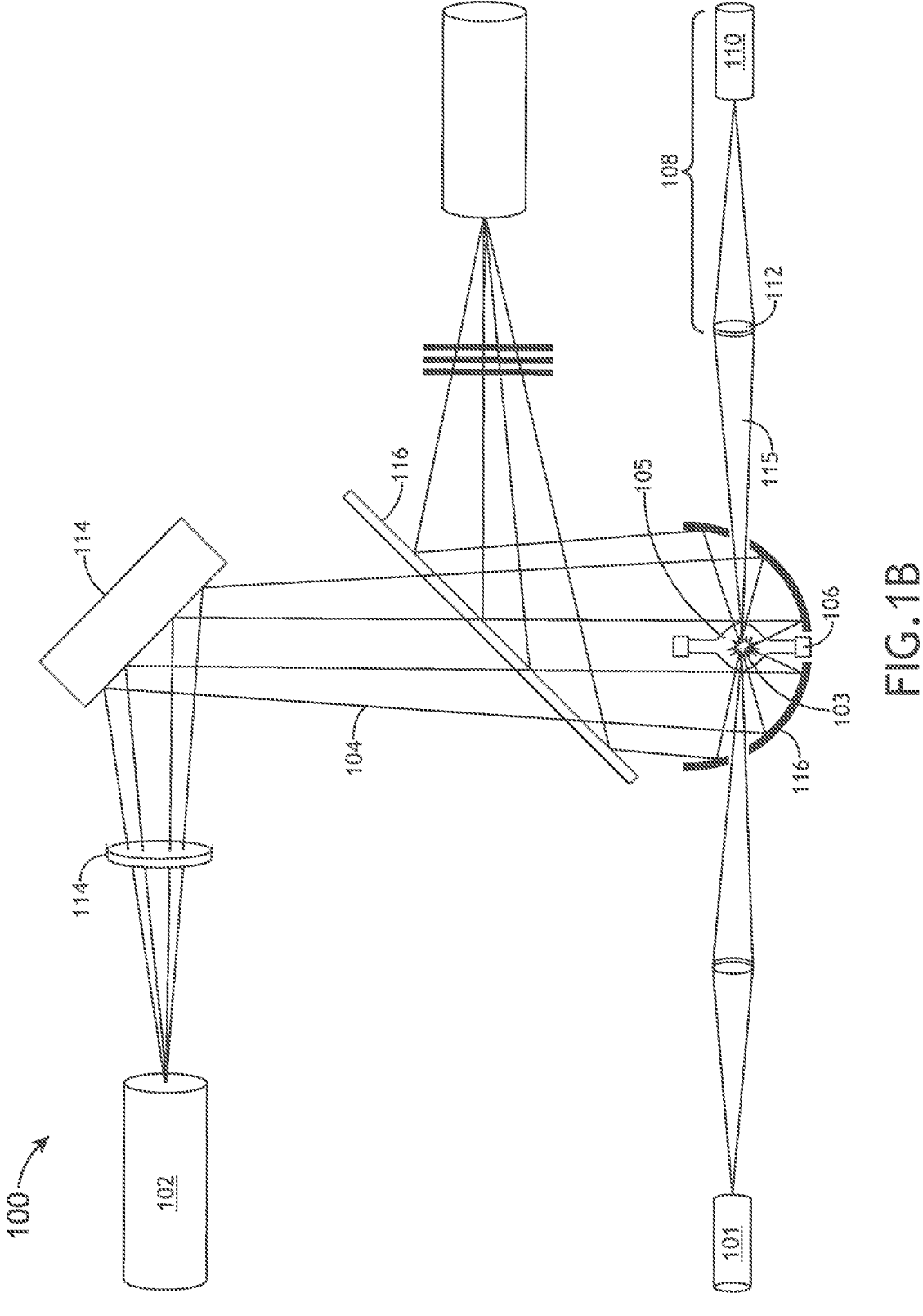
FIG. 1B is a schematic illustration of a laser sustained plasma (LSP) illumination system with illumination-assisted plasma ignition, in accordance with one or more embodiments of the present disclosure.

FIGS. 1A and 1B illustrate schematic illustrations of a laser sustained plasma (LSP) illumination system 100 with illumination-assisted plasma ignition, in accordance with one or more embodiments of the present disclosure. Generally, the illumination system 100 may include one or more pump sources 102, a gas containment vessel 106, and an ozone generation unit 108.

In one embodiment, the gas containment vessel 106 includes a volume of gas 105 that can be excited into a plasma state to generate a plasma 103. The gas containment vessel 106 may further be configured to sustain the plasma 103 after the plasma 103 is ignited. The volume of gas 105 contained within the gas containment vessel 106 may include any gas or gas mixture known in the art suitable for plasma generation. For example, the volume of gas 105 may include oxygen ($O_2$). By way of another example, the volume of gas 105 may include at least one of argon (Ar), krypton (Kr), xenon (Xe), nitrogen ($N_2$), or the like mixed with oxygen ($O_2$). For instance, the gas mixture 105 may include Ar gas mixed with oxygen. In another instance, the gas mixture 105 may include Xe and Ar gas mixed with oxygen. By way of another instance, the gas mixture 105 may include Xe, Kr, $N_2$, and Ar gas mixed with oxygen.

It is noted herein that, for the purposes of the present disclosure, the terms "LSP lamp" or "plasma lamp", and the like terms may collectively refer to the gas containment vessel 106 containing the volume of gas 105 and the plasma 103. Furthermore, the terms "plasma gas containment vessel" and "gas containment vessel" may be used interchangeably, unless noted otherwise herein. Additionally, the terms "volume of gas", "gas", "gas mixture", and like terms, may refer to the gas 105 contained within the gas containment vessel 106. The gas containment vessel 106 may include any gas containment vessel known in the art. For example, the gas containment vessel may include, but not limited to, at least one of a plasma bulb, a plasma cell, a plasma chamber, or the like.

It is noted herein that the gas containment vessel 106 may adapt a variety of shapes for use in the plasma lamp of the illumination system 100. For example, the gas containment vessel 106 may have a cylindrical shape. By way of another example, the cylindrical shape of the gas containment vessel 106 may be extended vertically so as to aid in dissipating convection within the plasma lamp. By way of a further example, the gas containment vessel 106 may have a spherical shape. By way of an additional example, the gas containment vessel 106 may have a cardioid shape (e.g., heart shape).

In another embodiment, the one or more pump sources 102 are configured to generate one or more pump beams 104 and direct the one or more pump beams 104 into the gas containment vessel 106. The one or more pump sources 102 may include any pump source known in the art. For example, the one or more pump sources 102 may include one or more lasers (e.g., pump lasers). By way of another example, the one or more pump sources 102 may include one or more infrared (IR) lasers. By way of a further example, the one or more pump sources 102 may include one or more continuous wave (CW) IR lasers.

Referring to FIG. 1B, in another embodiment, the system 100 includes one or more energy sources 101 configured to ignite the plasma 103 within the gas 105 contained within the gas containment vessel 106 via absorption of energy of the one or more energy sources 101 by a portion of the triatomic oxygen ($O_3$). The one or more energy sources 101 may include any energy source known in the suitable for igniting the plasma 103 including, but not limited to, an electrical ignition source (e.g., electrodes, electrical supply, or the like), an electromagnetic ignition source (e.g., tesla coil), a laser source, or the like. For example, the one or more energy sources 101 may be one or more start lasers configured to ignite the plasma 103. For instance, the one or more start lasers may include a pulsed start laser, such that light from the one or more pulsed start lasers is absorbed by the portion of the triatomic oxygen within the gas containment vessel 106 to ignite the plasma 103.

Referring again to FIG. 1A, in one embodiment, the one or more pump sources 102 act as the one or more energy sources 101 to ignite the plasma 103. In this embodiment, the one or more pump sources 102 act to ignite the plasma and sustain the plasma 103.

In another embodiment, the system 100 includes one or more illumination optics 114 configured to direct the one or more pump beams 104 into the gas 105 contained within the gas containment vessel 106 at a position proximate to a region of triatomic oxygen generation (e.g., the ozone generation unit 108). The one or more illumination optics 114 may include a lens, mirror, or the like. For example, the one or more illumination optics 114 may include a tuning mirror.

In another embodiment, the ozone generation unit 108 includes one or more illumination sources 110. The one or more illumination sources 110 may emit light of any selected wavelength, or wavelength range, such as, but not limited to, infrared radiation (IR), visible radiation, ultraviolet (UV) radiation, vacuum ultraviolet (VUV) radiation, deep ultraviolet (DUV) radiation, and/or extreme ultraviolet (EUV) radiation. For example, the one or more illumination sources 110 may include one or more ultraviolet (UV) light sources configured to generate one or more beams of UV light. By way of another example, the one or more illumination sources 110 may include one or more VUV light sources configured to generate one or more beams of VUV light. For instance, the one or more VUV light sources may include a discharge lamp such as, but not limited to, a mercury (Hg) discharge lamp or a deuterium lamp. In another instance, the one or more VUV light sources may include a VUV laser source. By way of an additional example, the one or more illumination sources 110 may include a microwave. By way of further example, the one or more illumination sources 110 may include a laser.

It is noted herein that, for the purposes of the present disclosure, the terms "illumination source" and "light source" may be used interchangeably, unless noted otherwise herein.

In another embodiment, the one or more illumination sources 110 are configured to generate a beam of illumination 115 (e.g., illumination beam) of an energy sufficient for converting a portion of diatomic oxygen ($O_2$) contained within the plasma gas containment vessel 106 to triatomic oxygen ($O_3$). It is noted herein that, for the purposes of the present disclosure, the terms "triatomic oxygen", "ozone", and "03" may be used interchangeably, unless noted otherwise herein. Furthermore, for the purposes of the present disclosure, the terms "diatomic oxygen" and "02" may be used interchangeably, unless noted otherwise herein.

In another embodiment, the ozone generation unit 108 includes one or more optical elements 112 (e.g., lens, mirror, ellipse, or the like) placed along the illumination pathway and configured to focus a portion of the illumination beam 115 into a region of the gas containment vessel 106 proximate to the location of the plasma 103. For example, the one or more optical elements 112 may include a lens, mirror, or the like.

In another embodiment, once the diatomic oxygen has been converted to triatomic oxygen using the illumination beam 115 from the illumination source 110, the one or more energy sources 101 are configured to ignite the plasma 103 within the gas containment vessel 106. For example, the energy from the one or more energy sources 101 is absorbed by a portion of the triatomic oxygen within the gas containment vessel 106 to ignite the plasma 103. As noted previously herein, the one or more pump sources 102 may act as the one or more energy sources 101 to ignite the plasma 103. Applicant notes that the gas containment vessel 106 must include a sufficient concentration of oxygen and the one or more pump sources 102 while acting as the one or more energy sources 101 must have sufficient power such that the triatomic oxygen may start the plasma 103 directly. For example, the one or more pump sources 102 may include a CW IR laser and the IR light from the CW IR laser may be absorbed by the portion of the triatomic oxygen within the gas containment vessel 106 to ignite the plasma 103. Also noted previously herein, the one or more energy sources 101 may include one or more start lasers. For example, the one or more start lasers may ignite the plasma 103 and the one or more pump sources 102 may sustain the plasma 103.

It is noted that triatomic oxygen displays small, but adequate, absorption at various wavelength ranges, which helps absorption of the one or more pump sources, one or more energy sources, and/or the one or more start lasers. For example, the one or more pump sources, one or more energy sources, and/or the one or more start lasers may be selected to emit in the near-IR, visible, or UV ranges. For instance, in the near-IR (NIR) range, at 900 nm the absorption of triatomic oxygen is approximately $10^{-22}$ cm²/molecule. By way of another example, at approximately 950 nm the absorption is between 10-23 and $10^{-22}$ cm²/molecule. It is noted that the above examples do not limit the scope of the present disclosure as it is recognized herein that various electromagnetic wavelength ranges may be utilized for their absorption characteristics by triatomic oxygen in the various embodiments of the present disclosure. Absorption characteristics of triatomic oxygen are described by V. Gorshelev et al. in *High spectral resolution ozone absorption cross-sections—Part* 1: *Measurements, data analysis and comparison with previous measurements around* 293 *K*, Atmos. Meas. Tech., 7, 609-624, 2014, which is incorporate herein by reference in the entirety.

Once the plasma 103 is ignited, the plasma 103 may emit broadband (BB) radiation. In another embodiment, the system 100 includes one or more collection optics 116 configured to collect at least a portion of the broadband radiation by the generated plasma 103 and direct the broadband radiation to one or more additional optical elements. The system 100 may include any collection optic known in the art. For example, the system 100 may include dielectric mirror. For instance, the system 100 may include a cold mirror configured to direct illumination from an elliptical reflector to downstream optics, such as filters and light collectors. By way of another example, the one or more collection optics 116 may include a collective element. For instance, the one or more collections optics 116 may be an elliptical reflector, as shown in FIGS. 1A and 1B. In one embodiment, the illumination beam 115 from the illumination source 110 may pass through the wall of the one or more collection optics 116.

The one or more additional optical elements may be placed along either the illumination pathway or the collection pathway. The one or more additional optical elements may be utilized to focus illumination from the one or more pump sources 102 and/or the one or more energy sources 101 into the volume of gas 105 of the gas containment vessel 106. Additionally, the additional optics may be utilized to focus broadband light emanating from the gas containment vessel 106 onto a selected target. In a further embodiment, additional optics includes filters placed along either the illumination pathway or the collection pathway in order to filter illumination prior to light entering the gas containment vessel 106 or to filter illumination following emission of the light from the gas containment vessel 106.

It is noted herein that the set of optics of system 100 as described above and illustrated in FIGS. 1A and 1B are provided merely for illustration and should not be interpreted as limiting. It is anticipated that a number of equivalent optical configurations may be utilized in the context of the present invention.

In another embodiment, the gas containment vessel 106 is refillable. The gas containment vessel 106 may include a gas port assembly (not shown) operably coupled to a portion of the containment vessel 106. For example, the containment vessel 106 may include a gas port assembly mechanically connected to the bottom portion of the containment vessel 106 and configured to facilitate the selective transfer of a gas 105 from a gas source to the internal region of the gas containment vessel 106. The utilization of refillable gas bulbs and various bulb shapes is described in U.S. Pat. No. 9,318,311, issued on Apr. 19, 2016, which is incorporated herein by reference in the entirety.

In one embodiment, the gas containment vessel 106 includes one or more transmitting portions (e.g., bulb, transmission element or window). The transmitting portion may be formed from any material known in the art that is at least partially transparent to the broadband radiation generated by plasma and/or the illumination from the illumination source 110. For example, one or more transmitting portions (e.g., bulb, transmission element or window) of the gas containment vessel 106 may be formed from any material known in the art that is at least partially transparent to EUV radiation, VUV radiation, DUV radiation, UV radiation, NUV radiation and/or visible light generated within the gas containment vessel 106. Further, one or more transmitting portions of the gas containment vessel 106 may be formed from any material known in the art that is at least partially transparent to IR radiation, visible light and/or UV light from the illumination source 110. In another embodiment, one or more transmitting portions of the gas containment vessel 106 may be formed from any material known in the art transparent to both radiation from the illumination source

110 (e.g., IR source) and radiation (e.g., EUV, VUV, DUV, UV, NUV radiation and/or visible light) emitted by the plasma 103.

In another embodiment, the plasma lamp containing the gas containment vessel 106 may be pre-exposed to VUV radiation such that triatomic oxygen may be generated before installing the lamp into the system 100. It is noted that triatomic oxygen is capable of surviving in the plasma lamp for a long period of time.

In a further embodiment, the plasma lamps may be subject to other forms of process to generate ozone either prior to lamp installation or during the ignition process discussed herein. For example, the lamps may be subject to microwave discharge, barrier discharge, or the like.

It is noted herein that alternative geometries of illumination may exist and FIGS. 1A and 1B are provided merely for illustrative purposes and shall not be construed as limiting the scope of the present disclosure. For example, the pump beam 104 and/or illumination beam 115 path may be altered.

While much of the present disclosure has focused on the generation of triatomic oxygen in a gas vessel containing diatomic oxygen, it is noted that in some alternative embodiments the system 100 of the present disclosure may be used to maintain a selected level of triatomic oxygen in a gas vessel pre-filled with triatomic oxygen. For example, in the case of a gas vessel pre-filled with triatomic oxygen, the system 100 may be used to recharge the level of triatomic oxygen in the gas vessel as the triatomic oxygen decays to diatomic oxygen over time.

Figure 2:
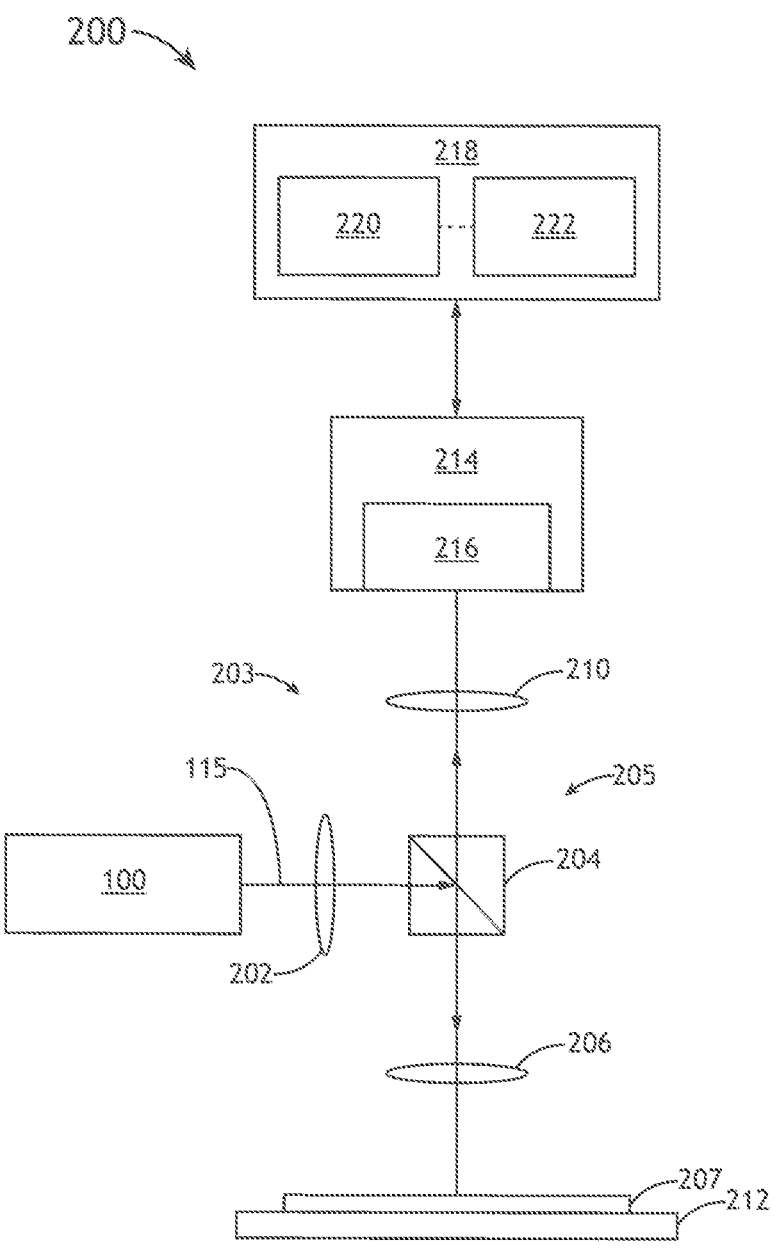
FIG. 2 is schematic illustration of an optical characterization system implementing a LSP illumination source, such as the LSP illumination system illustrated in any of FIGS. 1A through 4, or any combination thereof, in accordance with one or more embodiments of the present disclosure.

FIG. 2 is a schematic illustration of an optical characterization system 200 implementing an LSP illumination source, such as the LSP illumination system 100 illustrated in any of FIGS. 1 through 4, or any combination thereof, in accordance with one or more embodiments of the present disclosure.

It is noted herein that system 200 may comprise any imaging, inspection, metrology, lithography, or other characterization system known in the art. In this regard, system 200 may be configured to perform inspection, optical metrology, lithography, and/or any form of imaging on a specimen 207. Specimen 207 may include any sample known in the art including, but not limited to, a wafer, a reticle/photomask, and the like. It is noted that system 200 may incorporate one or more of the various embodiments of the LSP illumination system 100 described throughout the present disclosure.

In one embodiment, specimen 207 is disposed on a stage assembly 212 to facilitate movement of specimen 207. The stage assembly 212 may include any stage assembly 212 known in the art including, but not limited to, an X-Y stage, an R-θ stage, and the like. In another embodiment, stage assembly 212 is capable of adjusting the height of specimen 207 during inspection or imaging to maintain focus on the specimen 207.

In another embodiment, the illumination arm 203 is configured to direct illumination from the illumination system 100 to the specimen 207. The illumination arm 203 may include any number and type of optical components known in the art. In one embodiment, the illumination arm 203 includes one or more optical elements 202, a beam splitter 204, and an objective lens 206. In this regard, illumination arm 203 may be configured to focus illumination from the illumination system 100 onto the surface of the specimen 207. The one or more optical elements 202 may include any optical element or combination of optical elements known in the art including, but not limited to, one or more mirrors, one or more lenses, one or more polarizers, one or more gratings, one or more filters, one or more beam splitters, and the like.

In another embodiment, the collection arm 205 is configured to collect light reflected, scattered, diffracted, and/or emitted from specimen 207. In another embodiment, collection arm 205 may direct and/or focus the light from the specimen 207 to a sensor 216 of a detector assembly 214. It is noted that sensor 216 and detector assembly 214 may include any sensor and detector assembly known in the art. For example, the sensor 216 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, sensor 216 may include, but is not limited to, a line sensor or an electron-bombarded line sensor.

In another embodiment, detector assembly 214 is communicatively coupled to a controller 218 including one or more processors 220 and memory 222. For example, the one or more processors 220 may be communicatively coupled to memory 222, wherein the one or more processors 220 are configured to execute a set of program instructions stored on memory 222. In one embodiment, the one or more processors 220 are configured to analyze the output of detector assembly 214. In one embodiment, the set of program instructions are configured to cause the one or more processors 220 to analyze one or more characteristics of specimen 207. In another embodiment, the set of program instructions are configured to cause the one or more processors 220 to modify one or more characteristics of system 200 in order to maintain focus on the specimen 207 and/or the sensor 216. For example, the one or more processors 220 may be configured to adjust the objective lens 206 or one or more optical elements 202 in order to focus illumination from illumination system 100 onto the surface of the specimen 207. By way of another example, the one or more processors 220 may be configured to adjust the objective lens 206 and/or one or more optical elements 202 in order to collect illumination from the surface of the specimen 207 and focus the collected illumination on the sensor 216.

It is noted that the system 200 may be configured in any optical configuration known in the art including, but not limited to, a dark-field configuration, a bright-field orientation, and the like.

It is noted herein that the one or more components of system 200 may be communicatively coupled to the various other components of system 200 in any manner known in the art. For example, the illumination system 100, detector assembly 214, controller 218, and one or more processors 220 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

Figure 3:
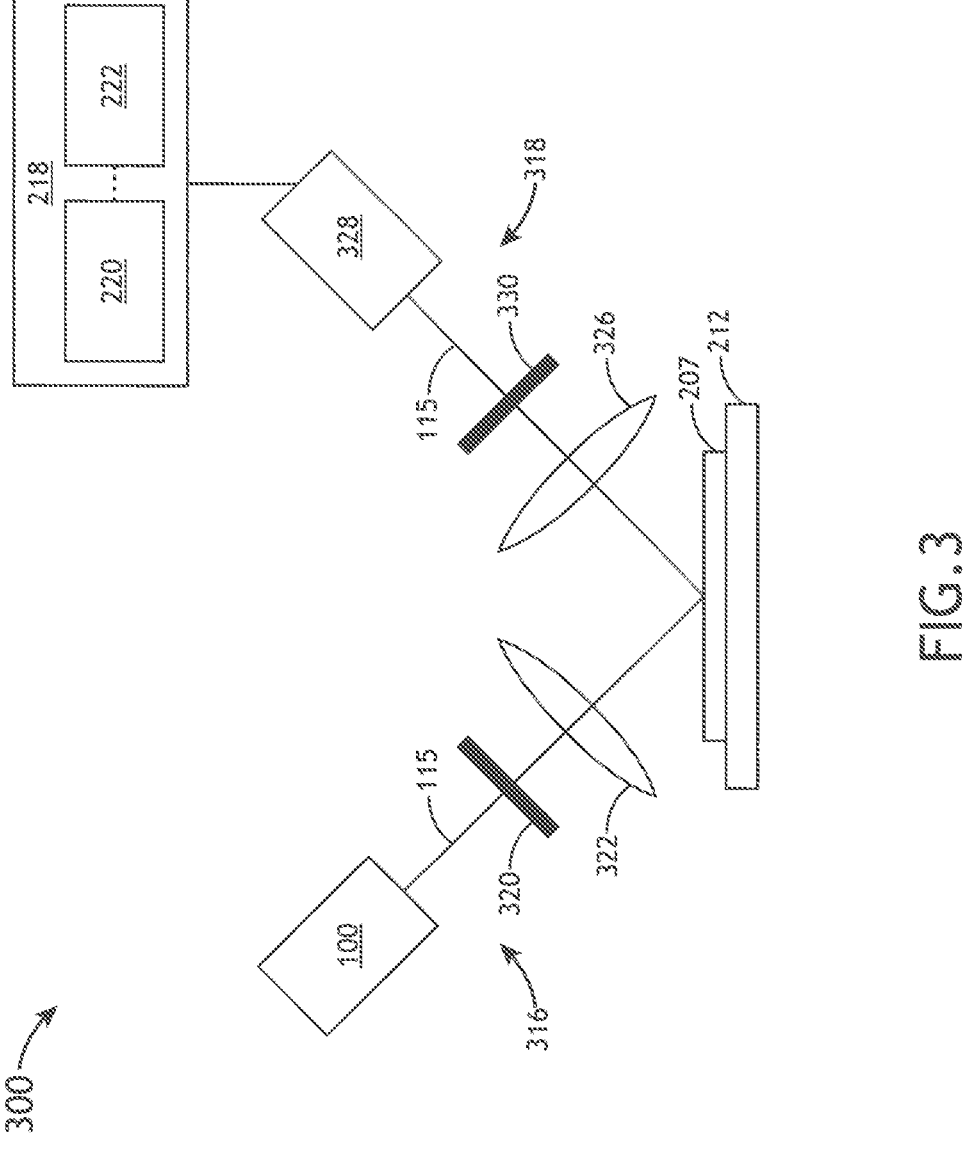
FIG. 3 is a schematic illustration of an optical characterization system implementing a LSP illumination source, such as the LSP illumination system illustrated in any of FIGS. 1A through 4, or any combination thereof, in accordance with one or more embodiments of the present disclosure.

FIG. 3 illustrates a simplified schematic diagram of an optical characterization system 300 arranged in a reflectometry and/or ellipsometry configuration, in accordance with one or more embodiments of the present disclosure. It is noted that the various embodiments and components described with respect to FIG. 2 may be interpreted to extend to the system of FIG. 3. The system 300 may include any type of metrology system known in the art.

In one embodiment, system 300 includes the illumination system 100, an illumination arm 316, a collection arm 318, a detector assembly 328, and the controller 218 including the one or more processors 220 and memory 222.

In this embodiment, the broadband illumination from the illumination system 100 is directed to the specimen 207 via the illumination arm 316. In another embodiment, the system 300 collects illumination emanating from the sample via the collection arm 318. The illumination arm pathway 316 may include one or more beam conditioning components 320 suitable for modifying and/or conditioning the broadband beam. For example, the one or more beam conditioning components 320 may include, but are not limited to, one or more polarizers, one or more filters, one or more beam splitters, one or more diffusers, one or more homogenizers, one or more apodizers, one or more beam shapers, or one or more lenses.

In another embodiment, the illumination arm 316 may utilize a first focusing element 322 to focus and/or direct the beam onto the specimen 207 disposed on the stage assembly 212. In another embodiment, the collection arm 218 may include a second focusing element 326 to collect illumination from the specimen 207.

In another embodiment, the detector assembly 328 is configured to capture illumination emanating from the specimen 207 through the collection arm 318. For example, the detector assembly 328 may receive illumination reflected or scattered (e.g., via specular reflection, diffuse reflection, and the like) from the specimen 207. By way of another example, the detector assembly 328 may receive illumination generated by the specimen 207 (e.g., luminescence associated with absorption of the beam, and the like). It is noted that detector assembly 328 may include any sensor and detector assembly known in the art. For example, the sensor may include, but is not limited to, CCD detector, a CMOS detector, a TDI detector, a PMT, an APD, and the like.

The collection arm 318 may further include any number of collection beam conditioning elements 330 to direct and/or modify illumination collected by the second focusing element 326 including, but not limited to, one or more lenses, one or more filters, one or more polarizers, or one or more phase plates.

The system 300 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

A description of an inspection/metrology tools suitable for implementation in the various embodiments of the present disclosure are provided in U.S. patent application Ser. No. 13/554,954, entitled "Wafer Inspection System," filed on Jul. 9, 2012; U.S. Published Patent Application 2009/0180176, entitled "Split Field Inspection System Using Small Catadioptric Objectives," published on Jul. 16, 2009; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System", by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

The one or more processors 220 of the present disclosure may include any one or more processing elements known in the art. In this sense, the one or more processors 220 may include any microprocessor-type device configured to execute software algorithms and/or instructions. It should be recognized that the steps described throughout the present disclosure may be carried out by a single computer system or, alternatively, multiple computer systems. In general, the term "processor" may be broadly defined to encompass any device having one or more processing and/or logic elements, which execute program instructions from a non-transitory memory medium 222. Moreover, different subsystems of the various systems disclosed may include processor and/or logic elements suitable for carrying out at least a portion of the steps described throughout the present disclosure.

The memory medium 222 may include any storage medium known in the art suitable for storing program instructions executable by the associated one or more processors 220. For example, the memory medium 222 may include a non-transitory memory medium. For instance, the memory medium 222 may include, but is not limited to, a read-only memory, a random-access memory, a magnetic or optical memory device (e.g., disk), a magnetic tape, a solid-state drive, and the like. In another embodiment, the memory 222 is configured to store one or more results and/or outputs of the various steps described herein. It is further noted that memory 222 may be housed in a common controller housing with the one or more processors 220. In an alternative embodiment, the memory 222 may be located remotely with respect to the physical location of the one or more processors 220. For instance, the one or more processors 220 may access a remote memory (e.g., server), accessible through a network (e.g., internet, intranet, and the like). In this regard, the one or more processors 220 of the controller 218 may execute any of the various process steps described throughout the present disclosure.

In some embodiments, the illumination system 100 and systems 200, 300, as described herein, may be configured as a "stand alone tool," interpreted herein as a tool that is not physically coupled to a process tool. In other embodiments, such an inspection or metrology system may be coupled to a process tool (not shown) by a transmission medium, which may include wired and/or wireless portions. The process tool may include any process tool known in the art such as a lithography tool, an etch tool, a deposition tool, a polishing tool, a plating tool, a cleaning tool, or an ion implantation tool. The results of inspection or measurement performed by the systems described herein may be used to alter a parameter of a process or a process tool using a feedback control technique, a feedforward control technique, and/or an in-situ control technique. The parameter of the process or the process tool may be altered manually or automatically.

The embodiments of the illumination system 100 and systems 200, 300 may be further configured as described herein. In addition, the illumination system 100 and systems 200, 300 may be configured to perform any other step(s) of any of the method implementation(s) (e.g., method 400) described herein.

FIG. 4 is a flow diagram illustrating a method 400 for igniting oxygen-containing LSP lamps, in accordance with one or more implementations of the present disclosure. It is noted herein that the steps of method 400 may be implemented all or in part by system 100 and/or system 200. It is further recognized, however, that the method 400 is not limited to the system 100 and/or system 200 in that additional or alternative system-level embodiments may carry out all or part of the steps of method 400.

In step 402, a portion of diatomic oxygen ($O_2$) contained within the plasma gas containment vessel 106 is converted into triatomic oxygen ($O_3$) at a selected location within the containment vessel 106 with one or more illumination beams. In one embodiment, the one or more illumination sources 110 (e.g., Hg discharge lamp) are configured to convert a portion of diatomic oxygen to triatomic oxygen within the containment vessel 106. The one or more optical elements 112 of the ozone generation unit 108 may be configured to focus a portion of the light into a region of the gas containment vessel 106 proximate to the location of the plasma 103.

In a step 404, one or more pump beams 104 are generated. In one embodiment, the one or more pump sources 102 are configured to generate one or more pump beams 104.

In a step 406, the one or more pump beams 104 are focused to the select location within the containment vessel 106 to ignite the plasma 103 via absorption of illumination of the one or more pump beams 104 by a portion of the triatomic oxygen ($O_3$). In one embodiment, the one or more illumination optics 114 are configured to direct the one or more pump beams 104 into the gas 105 contained within the gas containment vessel 106 at the select location of triatomic oxygen generation.

In a step 408, a portion of broadband illumination emitted by the plasma 103 is collected. In one embodiment, the one or more collection optics 116 are configured to collect at least a portion of the broadband radiation emitted by the generated plasma 103 and direct the broadband radiation to the one or more additional optical elements.

It is noted that the method 400 may reduce the threshold for start laser operation (e.g., igniting laser) which allows for a less-powerful start laser for oxygen-containing LSP lamps.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method comprising:
converting a portion of diatomic oxygen contained within a gas containment vessel to triatomic oxygen at a selected location within the gas containment vessel with one or more illumination beams;
generating one or more pump beams;
igniting a plasma via absorption of energy of one or more energy sources by a portion of the triatomic oxygen; and
collecting a portion of broadband illumination emitted by the plasma.

2. The method of claim 1, wherein the one or more beams of illumination are generated with one or more discharge lamps.

3. The method of claim 2, wherein the one or more discharge lamps comprises:
a mercury discharge lamp or deuterium lamp.

4. The method of claim 1, wherein the one or more beams of illumination are generated with one or more microwave generators.

5. The method of claim 1, wherein the one or more beams of illumination are generated with one or more lasers.

6. The method of claim 1, wherein the one or more energy sources comprises:
at least one of an electrical ignition source, an electro-magnetic ignition source, or a laser ignition source.

7. The method of claim 6, wherein the laser ignition source includes one or more start lasers.

8. The method of claim 7, wherein the one or more start lasers comprises:

one or more pulsed lasers, wherein light from the one or more pulsed lasers is absorbed by the portion of the triatomic oxygen within the gas containment vessel to ignite the plasma.

9. The method of claim 1, wherein the one or more pump beams act as the one or more energy sources to ignite the plasma within the gas contained within the gas containment vessel.

10. The method of claim 9, wherein the one or more pump beams are generated via one or more pump sources.

11. The method of claim 10, wherein the one or more pump sources comprises:
one or more lasers.

12. The method of claim 11, wherein the one or more pump sources comprises:
one or more infrared lasers.

13. The method of claim 12, wherein the one or more pump sources comprises:
one or more continuous wave (CW) infrared lasers, wherein infrared light from the one or more CW lasers is absorbed by the portion of the triatomic oxygen within the gas containment vessel to ignite the plasma.

14. The method of claim 1, wherein the diatomic oxygen is contained within a gas mixture.

15. The method of claim 14, wherein the gas mixture comprises:
at least one of argon, krypton, xenon, or triatomic oxygen mixed with the diatomic oxygen.

16. The method of claim 1, wherein the gas containment vessel comprises:
at least one of a plasma bulb, a plasma cell, or a plasma chamber.

17. The method of claim 1, further comprising:
performing at least one of inspection or metrology with the collected broadband illumination.

* * * * *